United States Patent
Adams

(10) Patent No.: US 8,370,932 B2
(45) Date of Patent: Feb. 5, 2013

(54) METHOD AND APPARATUS FOR DETECTING MALWARE IN NETWORK TRAFFIC

(75) Inventor: Robert Edward Adams, Mountain View, CA (US)

(73) Assignee: Webroot Inc., Broomfield, CO (US)

(*) Notice: Subject to any disclaimer, the term of this patent is extended or adjusted under 35 U.S.C. 154(b) by 428 days.

(21) Appl. No.: 12/236,419

(22) Filed: Sep. 23, 2008

(65) Prior Publication Data

US 2010/0077476 A1 Mar. 25, 2010

(51) Int. Cl.
*G06F 7/04* (2006.01)
(52) U.S. Cl. ............... 726/22; 726/3; 726/24; 713/188; 713/200
(58) Field of Classification Search .............. 726/22, 726/3, 24; 713/188, 200
See application file for complete search history.

(56) References Cited

U.S. PATENT DOCUMENTS

| | | | |
|---|---|---|---|
| 5,708,811 A | 1/1998 | Arendt | |
| 6,772,345 B1 | 8/2004 | Shetty | |
| 7,370,360 B2 | 5/2008 | van der Made | |
| 2002/0083334 A1* | 6/2002 | Rogers et al. | 713/200 |
| 2003/0115479 A1 | 6/2003 | Edwards et al. | |
| 2003/0212906 A1 | 11/2003 | Arnold et al. | |
| 2005/0169282 A1 | 8/2005 | Wittman | |
| 2005/0172115 A1 | 8/2005 | Bodorin | |
| 2005/0188272 A1 | 8/2005 | Bodorin | |
| 2006/0075490 A1 | 4/2006 | Boney | |
| 2006/0075494 A1 | 4/2006 | Bertman | |
| 2008/0028462 A1* | 1/2008 | Burtscher | 726/22 |
| 2008/0034073 A1 | 2/2008 | McCloy | |
| 2008/0052679 A1 | 2/2008 | Burtscher | |
| 2008/0289041 A1* | 11/2008 | Jarvis et al. | 726/24 |

* cited by examiner

*Primary Examiner* — Ashok Patel
*Assistant Examiner* — Brian Shaw
(74) *Attorney, Agent, or Firm* — Sheridan Ross P.C.

(57) ABSTRACT

A method and apparatus for detecting malware in network traffic is described. One embodiment executes, in an emulation environment, an executable file as it is being received serially over a network, execution beginning once a block of data including an entry point of the executable file has been received, execution halting whenever an instruction in the executable file references data not yet received and resuming once the data not yet received has been received, execution ceasing upon satisfaction of a termination condition; examining the emulation environment for indications that the executable file includes malware; and taking corrective action responsive to the results of examining the emulation environment for indications that the executable file includes malware.

21 Claims, 5 Drawing Sheets

US 8,370,932 B2

METHOD AND APPARATUS FOR DETECTING MALWARE IN NETWORK TRAFFIC

RELATED APPLICATIONS

The present application is related to commonly owned and assigned U.S. patent application Ser. No. 10/956,575, entitled "System and Method for Actively Operating Malware to Generate a Definition," now abandoned and commonly owned and assigned U.S. Pat. No. 7,590,707, entitled "Method and System for Identifying Network Addresses Associated With Suspect Network Destinations", each of which is incorporated herein by reference.

FIELD OF THE INVENTION

The present invention relates generally to computer networks. More specifically, but not by way of limitation, the present invention relates to methods and apparatuses for detecting malware in network traffic.

BACKGROUND OF THE INVENTION

In a network gateway apparatus (e.g., a Web proxy server, router, or firewall), it is often desirable to test streaming data for malware such as viruses, Trojan horses, worms, spyware, adware, keyloggers, etc. Blocking malware as network traffic passes through a gateway apparatus helps to reduce the risk that harmful malware will reach a user's desktop.

Testing network traffic for malware takes time, however. Unfortunately, conventional gateway apparatuses and applications require that an entire executable file be read before testing for malware can begin. The resulting latency negatively impacts performance and degrades the quality of the user experience.

It is thus apparent that there is a need in the art for an improved method and apparatus for detecting malware in network traffic.

SUMMARY OF THE INVENTION

Illustrative embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents, and alternative constructions that fall within the spirit and scope of the invention as expressed in the claims.

The present invention can provide a method and system for detecting malware in network traffic. One illustrative embodiment is a method for detecting malware in network traffic, the method comprising executing, in an emulation environment, an executable file as it is being received serially over a network, the executing beginning once a block of data including an entry point of the executable file has been received, the executing halting whenever an instruction in the executable file references data not yet received and resuming once the data not yet received has been received, the executing ceasing upon satisfaction of a termination condition; examining the emulation environment for indications that the executable file includes malware; and taking corrective action responsive to results of the examining.

Another illustrative embodiment is a network gateway apparatus, comprising at least one processor; a communication interface configured to send and receive data over a network; and a memory containing a plurality of program instructions executable by the at least one processor, the plurality of program instructions being configured to cause the at least one processor to execute, in an emulation environment, an executable file as it is being received by the network gateway apparatus serially over the network via the communication interface, execution of the executable file in the emulation environment beginning once a block of data including an entry point of the executable file has been received, execution of the executable file in the emulation environment halting whenever an instruction in the executable file references data not yet received and resuming once the data not yet received has been received, execution of the executable file in the emulation environment ceasing upon satisfaction of a termination condition; examine the emulation environment for indications that the executable file includes malware; and take corrective action responsive to results of examining the emulation environment for indications that the executable file includes malware.

In some embodiments, the methods of the invention can be implemented, at least in part, as a plurality of program instructions executable by a processor and stored on a computer-readable storage medium.

These and other embodiments are described in further detail herein.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings, wherein:

DETAILED DESCRIPTION

Figure 1:
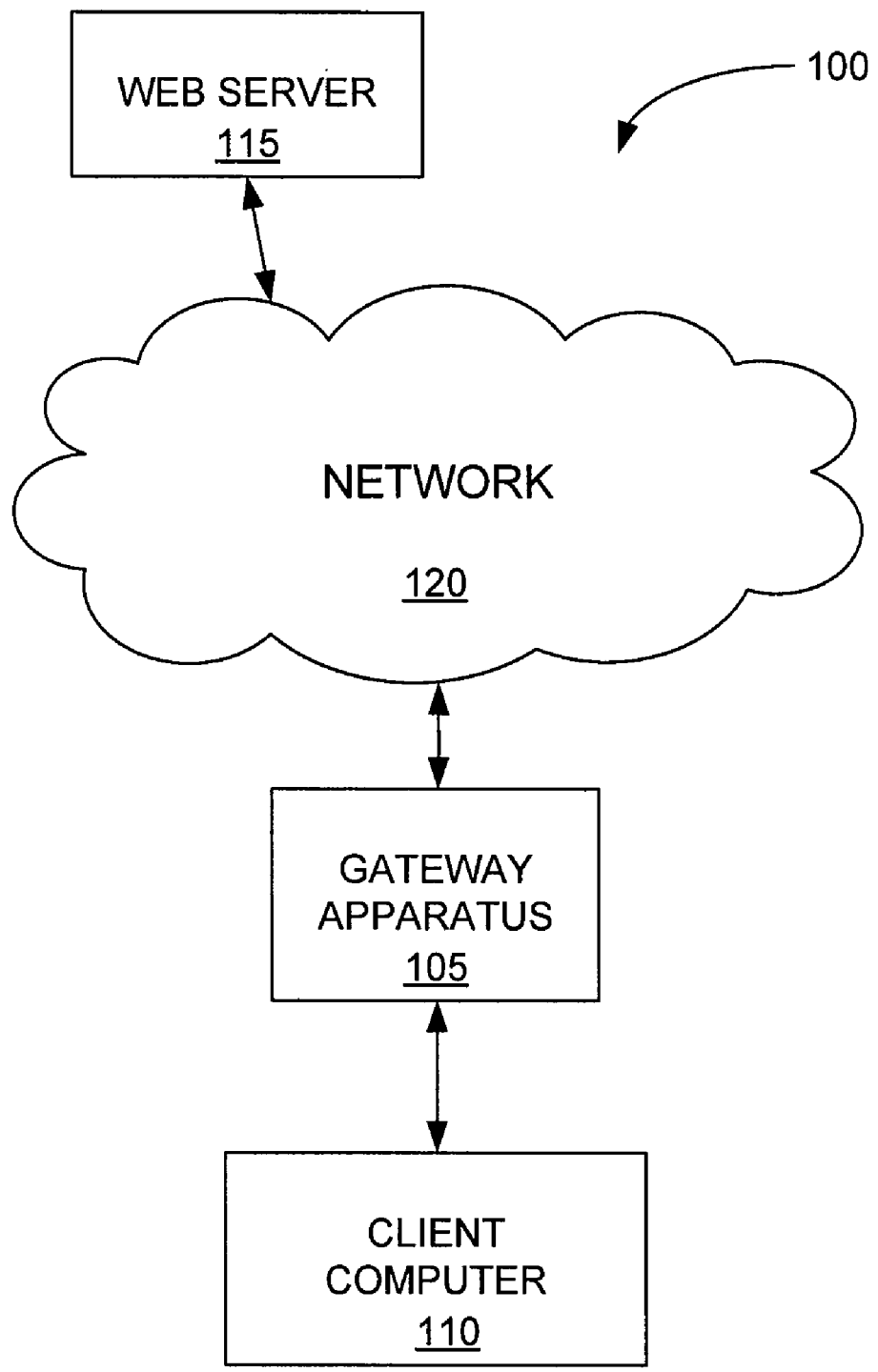
FIG. 1 is a block diagram of a computer networking environment in which various embodiments of the invention can be implemented.

In various illustrative embodiments of the invention, a gateway apparatus tests streaming data (e.g., a serially-received WINDOWS Portable Executable (PE) file) for malware by executing the executable file in an emulation environment. To overcome the problems of latency, execution of the executable file in the emulation environment begins before the entire executable file has been received. For example, in one embodiment, execution begins as soon as a block of data including the entry point of the executable file has been received, and execution continues as far as possible until an instruction in the executable file references data not yet received. At that point, the emulator waits for the needed data. Once the additional data has been received, emulated execution continues until another instruction is reached that references data not yet received, and so forth. Thus, the executable file is opportunistically executed in the emulation environment without waiting for the entire executable file to be received before beginning execution.

When a predetermined termination condition has been satisfied, emulated execution of the executable file ceases. At an appropriate time, the emulation environment is examined for indications that the executable file includes malware. Such an examination may be performed after emulated execution of the executable file has been terminated, or it may begin sooner, depending on the embodiment. Depending on the results of the examination, appropriate corrective action can be taken when the executable file is found to include malware, such as notifying a user (e.g., a network administrator) of the detected malware, blocking the executable file containing malware from propagating further over the network, or both.

The predetermined termination conditions can vary, depending on the embodiment, but two illustrative examples are (1) the executable program has been executed in the emulation environment for a predetermined period of time (or for a predetermined number of CPU cycles) or (2) the executable file has attempted to call a portion of the operating system's application programming interface (API) that is not implemented in the emulation environment. In one illustrative embodiment, satisfaction of either termination condition above causes emulated execution of the executable file to cease. Other termination conditions may be devised besides those listed above, depending on the particular embodiment. For a time- or CPU-cycles-based termination condition, the goal, in general, is to execute executable file 260 long enough for it to "show its true colors" as malware but not to execute it for so long that malware detection adds excessive latency to the network traffic.

The illustrative embodiments described above can, in many cases, significantly reduce the latency of scanning streaming network traffic for malware. In fact, in some cases, emulated execution of the executable file terminates before the entire executable file has been received. Such a situation can arise, for example, where a termination condition is satisfied early or the executable file, for whatever reason, does not reference data near the end of its binary. In such cases, the latency added by malware testing in accordance with various illustrative embodiments of the invention is nearly zero.

Referring now to the drawings, where like or similar elements are designated with identical reference numerals throughout the several views, and referring in particular to FIG. 1, it is a block diagram of a computer networking environment 100 in which various embodiments of the invention can be implemented. In FIG. 1, a gateway apparatus 105 enables a client computer 110 to communicate with one or more Web servers 115 via network 120, which, in some embodiments, includes the Internet. As used herein, a "gateway apparatus" refers to any device that acts as an intermediary between a client computer and a server over network 120. Examples include, without limitation, a Web proxy server, a router, and a firewall appliance. A gateway apparatus is one suitable environment to which the principles and techniques of the invention can be applied.

Figure 2:
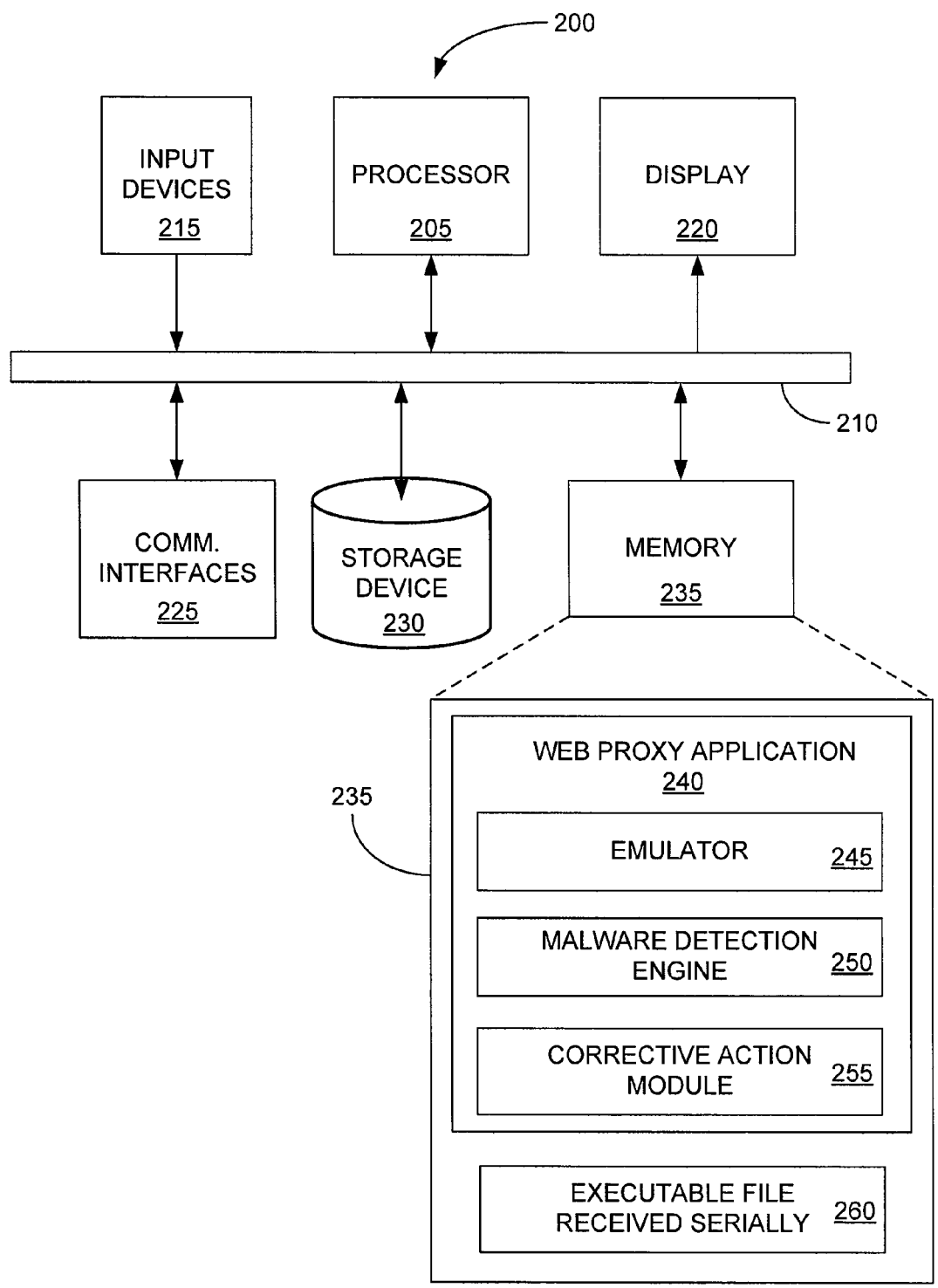
FIG. 2 is a functional block diagram of a Web proxy server in accordance with an illustrative embodiment of the invention.

FIG. 2 is a functional block diagram of one type of gateway apparatus—a Web proxy server 200—in accordance with an illustrative embodiment of the invention. In FIG. 2, processor 205 communicates over data bus 210 with input devices 215, display 220, communication interfaces 225, storage device 230, and memory 235. Though FIG. 2 shows only a single processor, multiple processors or a multi-core processor may be present in some embodiments.

Input devices 215 include, for example, a keyboard, a mouse or other pointing device, or other devices that are used to input data or commands to Web proxy server 200 to control its operation.

In the illustrative embodiment shown in FIG. 2, communication interfaces 225 are provided, at least in part, by a Network Interface Card (NIC) that implements a standard such as IEEE 802.3 (often referred to as "Ethernet") or IEEE 802.11 (a set of wireless standards). In general, communication interfaces 225 permit Web proxy server 200 to communicate with other computers such as client computer 110 and Web server 115 via one or more networks such as network 120 (see FIG. 1).

Memory 235 may include, without limitation, random access memory (RAM), read-only memory (ROM), flash memory, magnetic storage (e.g., a hard disk drive), optical storage, or a combination of these, depending on the particular embodiment. In FIG. 2, memory 235 includes Web proxy application 240. As those skilled in the computer networking art are aware, a Web proxy server is a gateway apparatus that services the requests of client computers by forwarding those requests to other servers on the network.

In the illustrative embodiment of FIG. 2, Web proxy application 240 includes the following functional modules: emulator 245, malware detection engine 250, and corrective action module 255. Web proxy application 240 typically includes other functional modules (not shown in FIG. 2 for simplicity) that support the fundamental network proxy function of Web proxy server 200. The functional modules shown in FIG. 2 are related to the malware-detection aspect of Web proxy application 240. The division of Web proxy application 240 into the particular functional modules shown in FIG. 2 is merely illustrative. In other embodiments, the functionality of these modules may be subdivided or combined in ways other than that indicated in FIG. 2.

In the illustrative embodiment of FIG. 2, Web proxy server 200 receives an executable file 260 serially over network 120 and tests it for the presence of malware. Executable file 260, in one illustrative embodiment, is a WINDOWS PE file, as mentioned above. In other embodiments, executable file 260 can be an executable file in accordance with a different operating system such as LINUX.

In one illustrative embodiment, Web proxy application 240 and its functional modules shown in FIG. 2 are implemented as software that is executed by processor 205. Such software may be stored, prior to its being loaded into RAM for execution by processor 205, on any suitable computer-readable storage medium such as a hard disk drive, an optical disk, or a flash memory (see storage device 230). In general, the functionality of Web proxy application 240 may be implemented as software, firmware, hardware, or any combination or sub-combination thereof.

In this illustrative embodiment, emulator 245 emulates, in software, the functionality of a central processing unit (CPU) such as an INTEL x86 or x86-64 CPU and also implements a subset of the operating system's API. The emulated API is designed to be called by non-trusted code. In one illustrative embodiment, for example, emulator 245 implements a subset of the MICROSOFT WINDOWS API. In other embodiments, emulated execution of executable file 260 may be accomplished by means other than software emulation. For example, executable file 260 can be executed natively in a carefully restricted hardware environment often called a "sandbox" by those skilled in the art. In another embodiment, executable file 260 can be executed using dynamic translation/recompilation. Herein, "emulation environment" refers broadly to any of the foregoing and other applicable techniques, and their associated resources, for securely executing untrusted program code. These techniques have in common some form of isolated execution of the untrusted program code.

In some sense, emulator 245 "tricks" executable file 260 into running in an emulation environment as if it were running on an ordinary computer system. This permits the executable file's 260 process memory and behavior to be analyzed for the presence of malware safely, without risking the integrity of Web proxy server 200 and without Web proxy server 200 necessarily having to run the same operating system as that for which executable file 260 is intended. Also, some malware is packed, encrypted, or both and must be unpacked and/or decrypted before it can be executed. Execution of executable file 260 in emulator 245 permits the process memory and behavior of such packed and/or encrypted malware to be examined for indications of malware.

As noted above, emulator 245 is configured to begin execution of executable file 260 before the entire file has been received by Web proxy server 200, to pause execution as needed when an instruction in executable file 260 references data not yet received, and to resume execution once that data has been received, emulator 245 ceasing execution upon satisfaction of a termination criterion, as explained above.

Malware detection engine 250 is configured to detect malware in executable file 260. In doing so, malware detection engine 250 may scan the process memory associated with executable file 260 in the emulation environment associated with emulator 245 for known malware definitions or signatures. Malware detection engine 250 may also analyze the behavior of executable file 260 in the emulation environment to determine whether executable file 260 exhibits behaviors commonly associated with malware (e.g., attempting to reformat a disk drive or modify the operating system's registry in particular ways). Malware detection engine 250 may employ the foregoing or other malware detection techniques separately or in combination, depending on the particular embodiment.

Corrective action module 255 is configured to take appropriate corrective action when malware detection engine 250 determines that executable file 260 includes malware. Specific corrective actions may include, without limitation, reporting the detected malware to a user (e.g., a network or system administrator) and preventing the executable file 260 from propagating further over network 120. That is, corrective action module 255 can block an executable file 260 that includes malware, thereby preventing it from reaching a client computer 110.

Figure 3:
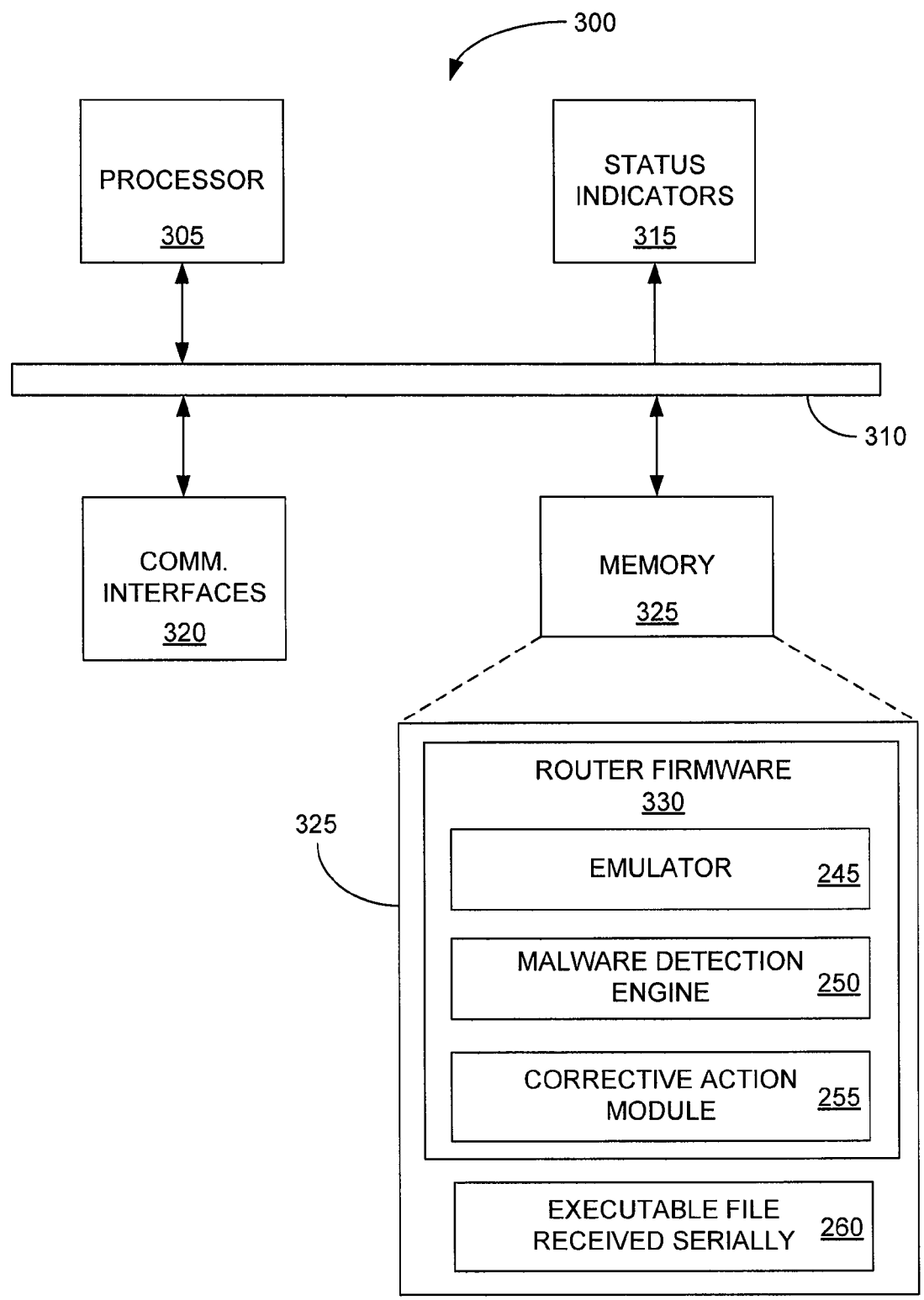
FIG. 3 is a functional block diagram of a router in accordance with an illustrative embodiment of the invention.

FIG. 3 is a functional block diagram of a router 300 in accordance with an illustrative embodiment of the invention. In FIG. 3, processor 305 communicates over data bus 310 with status indicators 315, communication interfaces 320, and memory 325. As with the embodiment discussed in connection with FIG. 2, more than one processor 305 or a multi-core processor may be present in some embodiments. In one embodiment, status indicators 315 are light-emitting diodes (LEDs) or other visual indicators of the operational status of router 300. Communication interfaces 320 are similar to communication interfaces 225 described above in connection with FIG. 2.

In the illustrative embodiment shown in FIG. 3, memory 325 includes router firmware 330. In this embodiment, router firmware 330 includes functional modules similar to those discussed above in connection with FIG. 2: emulator 245, malware detection module 250, and corrective action module 255. As in the embodiment discussed above in connection with FIG. 2, router 300 receives an executable file 260 in serial fashion over network 120. Note that router firmware 330 typically includes other functional modules (not shown in FIG. 3 for simplicity) that support its fundamental network-traffic-routing tasks.

A network gateway apparatus such as Web proxy server 200 or router 300 may, in some embodiments, be configured as a network firewall. In the computer industry, a "firewall" commonly refers to a device, set of devices, and/or software/firmware configured to permit or deny, encrypt, decrypt, or proxy all network traffic between different security domains in accordance with a set of rules or other criteria.

Figure 4:
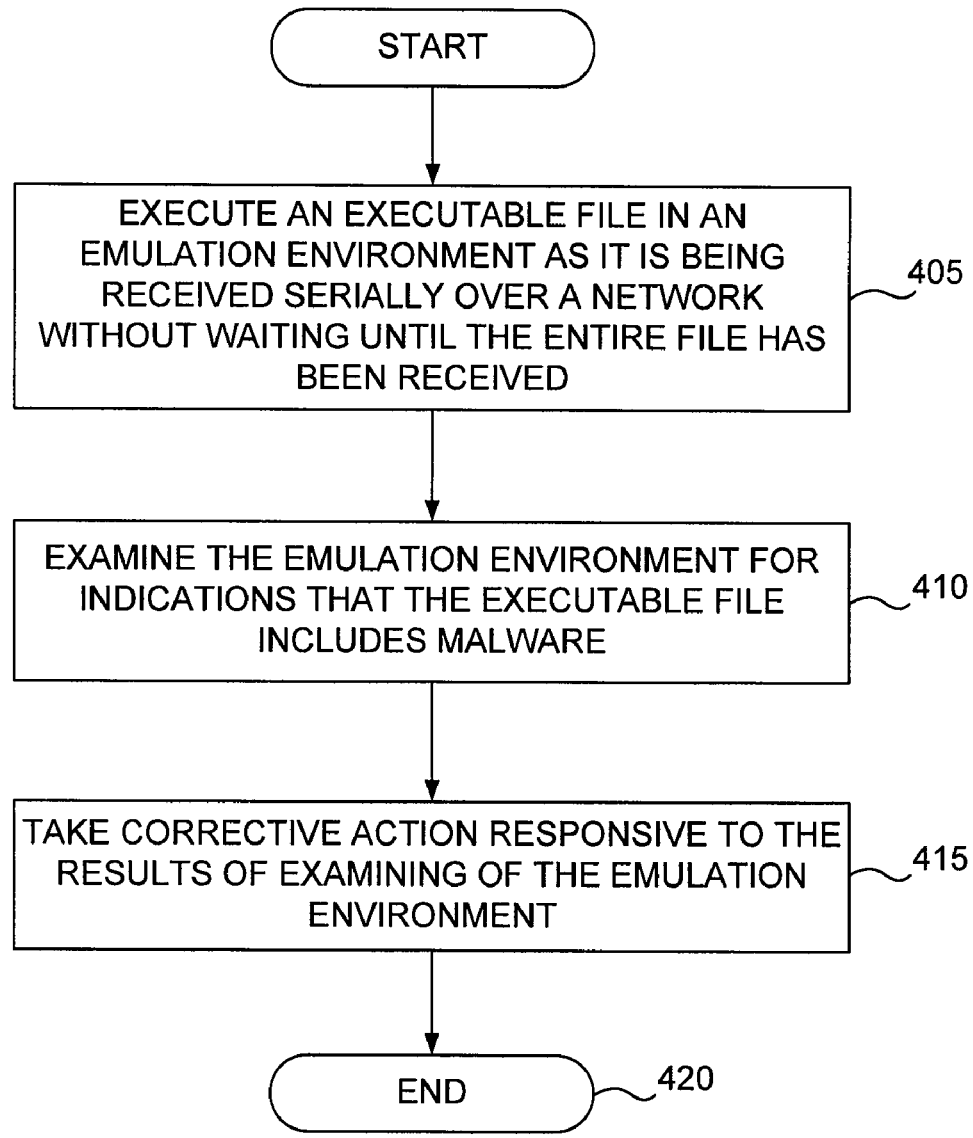
FIG. 4 is a flowchart of a method for detecting malware in network traffic in accordance with an illustrative embodiment of the invention.

FIG. 4 is a flowchart of a method for detecting malware in network traffic in accordance with an illustrative embodiment of the invention. At 405, executable file 260 is executed in an emulation environment as it is being received serially over network 120. In one embodiment, execution begins as soon as the block of data containing the entry point of executable file 260 has been received. Once begun, emulated execution continues until an instruction in executable file 260 references data not yet received, at which point emulated execution halts temporarily. Once the referenced-but-not-yet-received data has been received, emulated execution resumes where it left off, and this cycle of execution and pausing the execution is repeated as needed while executable file 260 is being received serially over network 120.

Upon satisfaction of a termination condition, execution of executable file 260 in the emulation environment ceases. As discussed above, the termination of emulated execution may be triggered by, for example, a predetermined limit on elapsed execution time or number of expended CPU cycles having been reached, an attempt by executable file 260 to call a portion of the operating system's API that is not implemented in the emulator, or some other suitable termination criterion, depending on the particular embodiment.

At 410, malware detection engine 250 examines the emulation environment associated with emulator 245 for indications that executable file 260 includes malware. As discussed above, such an examination can include scanning the process memory associated with executable file 260 for known malware definitions, examining the behavior of executable file 260 in the emulation environment, or both.

At 415, corrective action module 255 takes corrective action responsive to the results of malware detection engine's 250 examination of the emulation environment. If malware detection engine 250 determines, at 410, that executable file 260 includes malware, corrective action could include, without limitation, notifying a user (e.g., by displaying a warning on a display or writing a message to an event log), preventing executable file 260 from propagating further over network 120, or both. At 420, the method terminates.

In some embodiments, as much as possible of executable file 260 is read at a time, depending on network and device limitations. In other embodiments, executable file 260 is read in blocks of equal, fixed size.

Figure 5:
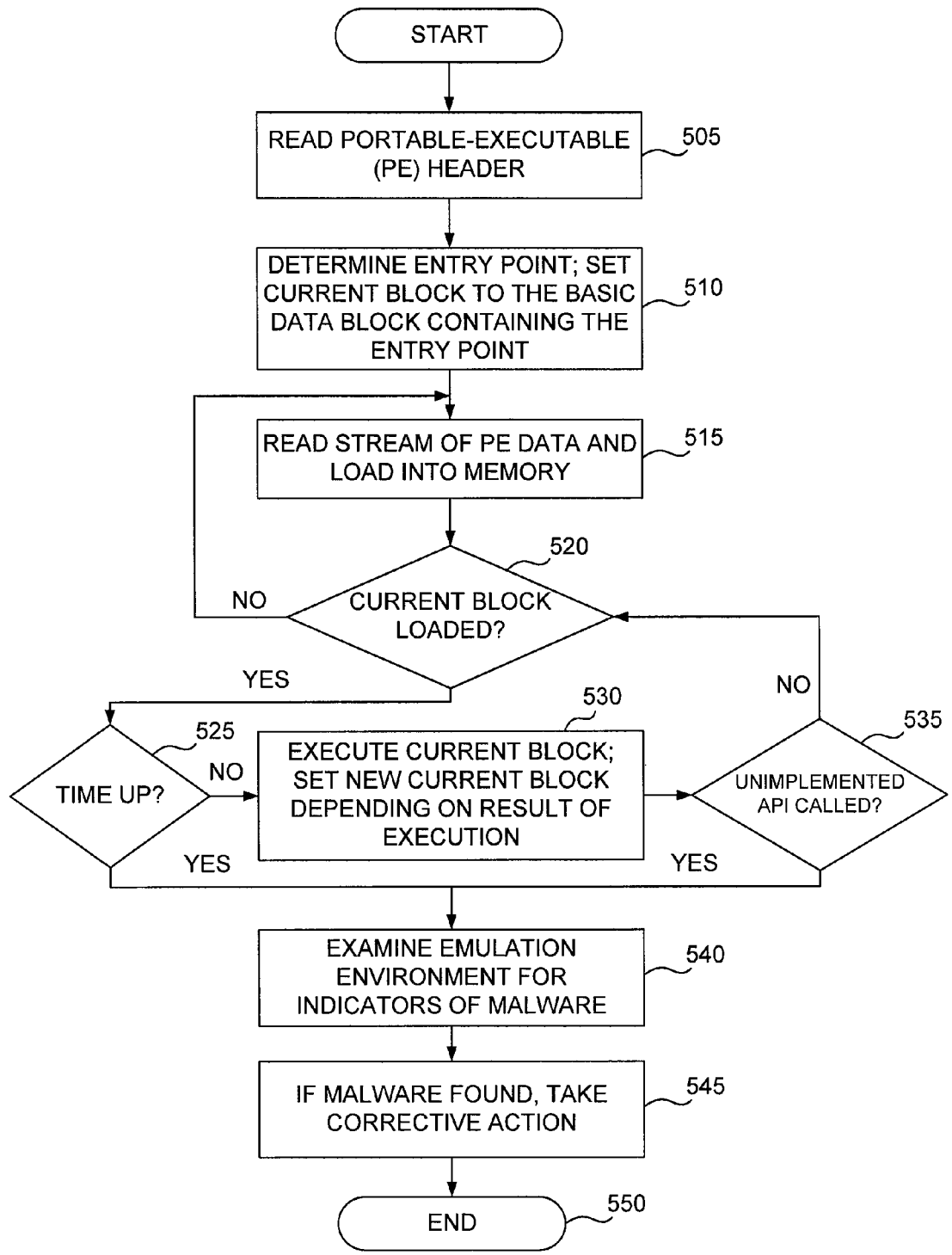
FIG. 5 is a flowchart of a method for detecting malware in network traffic in accordance with another illustrative embodiment of the invention.

FIG. 5 is a flowchart of a method for detecting malware in network traffic in accordance with another illustrative embodiment of the invention. In this particular embodiment, executable file 260 is assumed to be a WINDOWS PE file. At 505, a gateway apparatus (e.g., Web proxy server 200 or router 300) reads the PE header of executable file 260 as it receives the file serially over network 120. From this information, the gateway apparatus determines, at 510, the entry point of executable file 260 and sets the current data block to the data block containing the entry point.

At 515, the gateway apparatus reads the stream of PE data and loads it into memory. If the current data block has been loaded in its entirety at 520, the method proceeds to 525.

Otherwise, the method loops to Block 515 until all of the data in the current data block has been read.

At 525, the gateway apparatus checks to determine whether a predetermined emulated-execution time limit for executable file 260 has been reached. If not, the current data block is executed in emulator 245. If the emulated execution of executable file 260 requires data in a subsequent data block of the file (a data block of the file not yet received), the identity of the current data block is updated to reflect that condition. In such cases, emulated execution pauses temporarily while the necessary data is read to permit execution to continue. If, during execution of the current data block, no attempt is made to call an unimplemented portion of the API at 535, the method returns to Block 520 for reading of the current data block, if needed. Otherwise, if the emulated-execution time limit (or CPU-cycle limit) was reached at 525 or executable file 260 attempted to call an unimplemented portion of the API at 535, malware detection engine 250, at 540, examines the emulation environment associated with emulator 245 for indicators of malware, as explained above.

At 545, corrective action module 255 takes appropriate corrective action responsive to the results of the examination of the emulation environment by malware detection engine 250. As discussed above in connection with FIG. 4, if malware detection engine 250 determines, at 540, that executable file 260 includes malware, taking corrective action could include, without limitation, notifying a user, preventing executable file 260 from propagating further over network 120, or both. At 550, the method terminates.

In one illustrative embodiment of the invention, the methods of the invention are implemented, at least in part, as a plurality of program instructions executable by a processor and stored on a computer-readable storage medium such as, without limitation, a hard disk drive (HDD), optical disc, ROM, or flash memory. In such an embodiment, the various functional units such as emulator 245, malware detection engine 250, and corrective action module 255 can be implemented as one or more instruction segments (e.g., functions or subroutines).

Those skilled in the art are well aware that modern file systems and operating systems support memory-mapped input/output (I/O), including virtual memory. Those skilled in the art may also recognize that the above techniques discussed in connection with various illustrative embodiments enable one to pretend that memory-mapped I/O is also available in a network streaming-data environment. As discussed above, such an approach can significantly reduce the latency incurred in detecting malware in network traffic.

In conclusion, the present invention provides, among other things, a method and apparatus for detecting malware in network traffic. Those skilled in the art can readily recognize that numerous variations and substitutions may be made in the invention, its use, and its configuration to achieve substantially the same results as achieved by the embodiments described herein. Accordingly, there is no intention to limit the invention to the disclosed exemplary forms. Many variations, modifications, and alternative constructions fall within the scope and spirit of the disclosed invention as expressed in the claims.

What is claimed is:

1. A method for detecting malware in network traffic, the method performed by program instructions executable by a processor of a computing system and stored on a tangible computer-readable medium accessible by the computing system, the method comprising:
   determining, using the processor of the computer system, an entry point of an executable file, wherein the executable file comprises a plurality of blocks and includes at least one block containing the determined entry point;
   determining, using the processor of the computing system and once the at least one block has been loaded into a memory, whether a predetermined emulated-execution time limit has been reached;
   executing, using the processor of the computing system and in response to determining that the predetermined emulated-execution time limit has not been reached, the at least one block in an emulation environment such that the executable file is executed as it is being received serially over a network and before the entire executable file has been received, the executing halting whenever an instruction in a block already received references data in a block not yet received and resuming once the data in the block not yet received has been received, the executing ceasing upon satisfaction of a termination condition;
   examining, using the processor of the computing system, the emulation environment for indications that the executable file includes malware; and
   taking corrective action, using the processor of the computing system, responsive to results of the examining.

2. The method of claim 1, wherein the termination condition is that the executable file has been executed in the emulation environment for a predetermined period of time.

3. The method of claim 1, wherein the termination condition is that the executable file has attempted to call a portion of an application programming interface (API) that is not implemented in the emulation environment.

4. The method of claim 1, wherein the examining begins before the termination condition has been satisfied.

5. The method of claim 1, wherein the examining includes scanning, using the processor of the computing system, process memory associated with the executable file.

6. The method of claim 1, wherein the examining includes analyzing behavior of the executable file.

7. The method of claim 1, wherein taking corrective action responsive to results of the examining includes reporting to a user that the executable file includes malware.

8. The method of claim 1, wherein taking corrective action responsive to results of the examining includes preventing the executable file from propagating further over the network when the results of the examining indicate that the executable file includes malware.

9. The method of claim 1, wherein the executable file is received in segments of equal size.

10. The method of claim 1, wherein as much as possible of the executable file is received at a time while the executable file is being received serially over the network.

11. A network gateway apparatus, comprising:
    at least one processor;
    a communication interface configured to send and receive data over a network; and
    a memory containing a plurality of program instructions executable by the at least one processor, the plurality of program instructions being configured to cause the at least one processor to:
    determine an entry point of an executable file, wherein the executable file comprises a plurality of blocks and includes at least one block containing the determined entry point;
    determine, once the at least one block has been loaded into the memory, whether a predetermined emulated-execution time limit has been reached;
    execute, in response to determining that the predetermined emulated-execution time limit has not been reached, the at least one block in an emulation environment such that the executable file is executed as it is being received by the network gateway apparatus serially over the network via the communication interface and before the entire executable file has been received by the network gateway apparatus, execution of the executable file in the emulation environment halting whenever an instruction in a block already received references data in a block not yet received and resuming once the data in the block not yet received has been received, execution of the executable file in the emulation environment ceasing upon satisfaction of a termination condition;

examine the emulation environment for indications that the executable file includes malware; and take corrective action responsive to results of examining the emulation environment for indications that the executable file includes malware.

12. The network gateway apparatus of claim 11, wherein the network gateway apparatus is a Web proxy server and the plurality of program instructions include a Web proxy application.

13. The network gateway apparatus of claim 11, wherein the network gateway apparatus is a router.

14. A non-transitory tangible computer-readable storage medium containing a plurality of program instructions executable by a processor for detecting malware in network traffic, the plurality of program instructions comprising:

a first instruction segment configured to determine an entry point of an executable file, wherein the executable file comprises a plurality of blocks and includes at least one block containing the determined entry point, the first instruction segment further configured to determine, once the at least one block has been loaded into a memory, whether a predetermined emulated-execution time limit has been reached, the first instruction segment further configured to execute, in response to determining that the predetermined emulated-execution time limit has not been reached, the at least one block in an emulation environment such that the executable file is executed as it is being received serially over a network and before the entire executable file has been received, execution of the executable file in the emulation environment halting whenever an instruction in a block already received references data in a block not yet received and resuming once the data in the block not yet received has been received, execution of the executable file in the emulation environment ceasing upon satisfaction of a termination condition;

a second instruction segment configured to examine the emulation environment for indications that the executable file includes malware; and a third instruction segment configured to take corrective action responsive to results of examining the emulation environment for indications that the executable file includes malware.

15. The non-transitory tangible computer-readable storage medium of claim 14, wherein the termination condition is that the executable file has been executed in the emulation environment for a predetermined period of time.

16. The non-transitory tangible computer-readable storage medium of claim 14, wherein the termination condition is that the executable file has attempted to call a portion of an application programming interface (API) that is not implemented in the emulation environment.

17. The non-transitory tangible computer-readable storage medium of claim 14, wherein the second instruction segment is configured to begin examining the emulation environment for indications that the executable file includes malware before the termination condition has been satisfied.

18. The non-transitory tangible computer-readable storage medium of claim 14, wherein, in examining the emulation environment for indications that the executable file includes malware, the second instruction segment is configured to scan process memory associated with the executable file.

19. The non-transitory tangible computer-readable storage medium of claim 14, wherein, in examining the emulation environment for indications that the executable file includes malware, the second instruction segment is configured to analyze behavior of the executable file.

20. The non-transitory tangible computer-readable storage medium of claim 14, wherein, in taking corrective action responsive to results of examining the emulation environment for indications that the executable file includes malware, the third instruction segment is configured to report to a user that the executable file includes malware.

21. The non-transitory tangible computer-readable storage medium of claim 14, wherein, in taking corrective action responsive to results of examining the emulation environment for indications that the executable file includes malware, the third instruction segment is configured to prevent the executable file from propagating further over the network when the results indicate that the executable file includes malware.

* * * * *